United States Patent
Kitanaka

(10) Patent No.: US 12,483,285 B2
(45) Date of Patent: Nov. 25, 2025

(54) COMMUNICATION APPARATUS

(71) Applicant: Mitsubishi Electric Corporation, Tokyo (JP)

(72) Inventor: Shigenori Kitanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 300 days.

(21) Appl. No.: 18/222,070

(22) Filed: Jul. 14, 2023

(65) Prior Publication Data

US 2023/0361795 A1    Nov. 9, 2023

Related U.S. Application Data

(63) Continuation of application No. PCT/JP2021/014528, filed on Apr. 5, 2021.

(51) Int. Cl.
*H04B 1/10* (2006.01)

(52) U.S. Cl.
CPC .................................. *H04B 1/109* (2013.01)

(58) Field of Classification Search
CPC .... H04B 1/1036; H04B 1/109; H04B 1/7097; H04B 2001/6912; H04B 7/0848;
(Continued)

(56) References Cited

U.S. PATENT DOCUMENTS

| | | | |
|---|---|---|---|
| 5,598,428 A * | 1/1997 | Sato | H04B 7/0845 380/42 |
| 6,069,912 A | 5/2000 | Sawahashi et al. | |

(Continued)

FOREIGN PATENT DOCUMENTS

| | | |
|---|---|---|
| JP | 11-298388 A | 10/1999 |
| JP | 4906875 B2 | 3/2012 |

(Continued)

OTHER PUBLICATIONS

Extended European Search Report for European Application No. 21935936.1, dated Feb. 28, 2024.

*Primary Examiner* — Nguyen T Vo
(74) *Attorney, Agent, or Firm* — Birch, Stewart, Kolasch & Birch, LLP

(57) ABSTRACT

A receiver that is a communication apparatus includes a plurality of receiving antennas that receives, as reception signals, interference signals and desired signals transmitted by a transmitting apparatus that performs sequence multiplication processing at the time of transmission, and an interference suppressor that generates, for each of the receiving antennas, a weight used when combining the reception signals received by the respective receiving antennas, and performs inter-antenna combining that is combining of the reception signals, using the weights, to perform interference suppression on the reception signals. The interference suppressor performs reverse sequence multiplication processing on the reception signals to vary interference forms in the reception signals, generates the weights differently for different combinations of the reception signals on which to perform the interference suppression, and performs the interference suppression using, from among the generated weights, the weights by which the desired signals strengthen each other.

4 Claims, 10 Drawing Sheets

(58) Field of Classification Search
CPC ............... H04J 13/0022; H04J 13/0048; H04J 13/0062; Y02D 30/70
See application file for complete search history.

(56) References Cited

U.S. PATENT DOCUMENTS

| | | |
|---|---|---|
| 6,665,286 B1 | 12/2003 | Maruta et al. |
| 2010/0048151 A1 | 2/2010 | Hara |
| 2015/0381396 A1 | 12/2015 | Chen et al. |
| 2016/0006468 A1* | 1/2016 | Gale ..................... H04B 1/123 |
| | | 455/296 |
| 2019/0229797 A1 | 7/2019 | Umeda et al. |
| 2020/0395686 A1* | 12/2020 | Jamin ..................... H01Q 5/28 |
| 2024/0305360 A1* | 9/2024 | Fujii ................. H04B 7/06952 |

FOREIGN PATENT DOCUMENTS

| | | |
|---|---|---|
| JP | 6463564 B2 | 2/2019 |
| WO | WO 97/20400 A1 | 6/1997 |
| WO | WO 2014/155494 A1 | 10/2014 |

\* cited by examiner

INTERFERENCE WAVE

DESIRED WAVE

DESIRED WAVE

COMMUNICATION APPARATUS

CROSS-REFERENCE TO RELATED APPLICATION

This application is a continuation application of International Application PCT/JP2021/014528, filed on Apr. 5, 2021, and designating the U.S., the entire contents of which are incorporated herein by reference.

BACKGROUND OF THE INVENTION

1. Field of the Invention

The present disclosure relates to a communication apparatus, a communication system, a control circuit, a storage medium, and a communication method for performing wireless communication.

2. Description of the Related Art

In wireless communication systems that perform wireless communication, selecting an industrial, scientific, and medical (ISM) band has an advantage in that the band can be used without a license. The frequency band of the ISM band is used in various communication systems including wireless local area networks (LANs) and Bluetooth (registered trademark).

Even in an environment where various wireless communication systems are present, interference arising in the same wireless communication system can be avoided by controlling communication timings using network synchronization, avoiding overlapping of communication frequencies by frequency-hopping spread spectrum (FHSS), or the like.

On the other hand, for a signal transmitted from other wireless communication system, interference avoidance is difficult because the communication timing, the frequency used, etc. are unknown. That is, when a wireless communication system receives a desired signal that is a transmission signal of the wireless communication system itself and, at the same time, a signal transmitted from the other wireless communication system, the signal transmitted from the other wireless communication system is an interference signal. If the level of the interference signal is great, the communication of the wireless communication system itself is affected. Thus, interference resistance is an important technique to achieve stable communication.

To improve interference resistance, a wireless communication system described in Japanese Patent No. 4906875 measures interference power by dispersedly disposing null symbols in a time direction and a frequency direction in a packet, and generates weights to cancel interference components out based on the interference power, to perform inter-antenna combining processing.

However, in the technique of Japanese Patent No. 4906875, reception signals are weighted and combined to cancel out interference wave components of the reception signals. Thus, not only the interference wave components but also desired wave components are weighted, so that the desired wave components are affected by the weights. Consequently, the technique of Japanese Patent No. 4906875 has a problem that, depending on the relationship between the received desired waves and the weights for interference waves, there is a case where the desired waves may also be canceled out by the combining processing, together with the interference waves, resulting in greatly degrading demodulation performance.

SUMMARY OF THE INVENTION

To solve the above-described problem and achieve the object, a communication apparatus of the present disclosure includes a plurality of receiving antennas that receives, as reception signals, interference signals and desired signals transmitted by a transmitting apparatus that performs sequence multiplication processing at the time of transmission. The communication apparatus of the present disclosure also includes an interference suppressor that generates, for each of the receiving antennas, a weight used when combining the reception signals received by the respective receiving antennas, and performs inter-antenna combining that is combining of the reception signals, using the weights, to perform interference suppression on the reception signals. The interference suppressor performs reverse sequence multiplication processing on the reception signals to vary interference forms in the reception signals, generates the weights differently for different combinations of the reception signals on which to perform the interference suppression, and performs the interference suppression using, from among the generated weights, the weights by which the desired signals strengthen each other.

DETAILED DESCRIPTION OF THE PREFERRED EMBODIMENTS

Hereinafter, a communication apparatus, a communication system, a control circuit, a storage medium, and a communication method according to an embodiment of the present disclosure will be described in detail with reference to the drawings.

Embodiment

Figure 1:
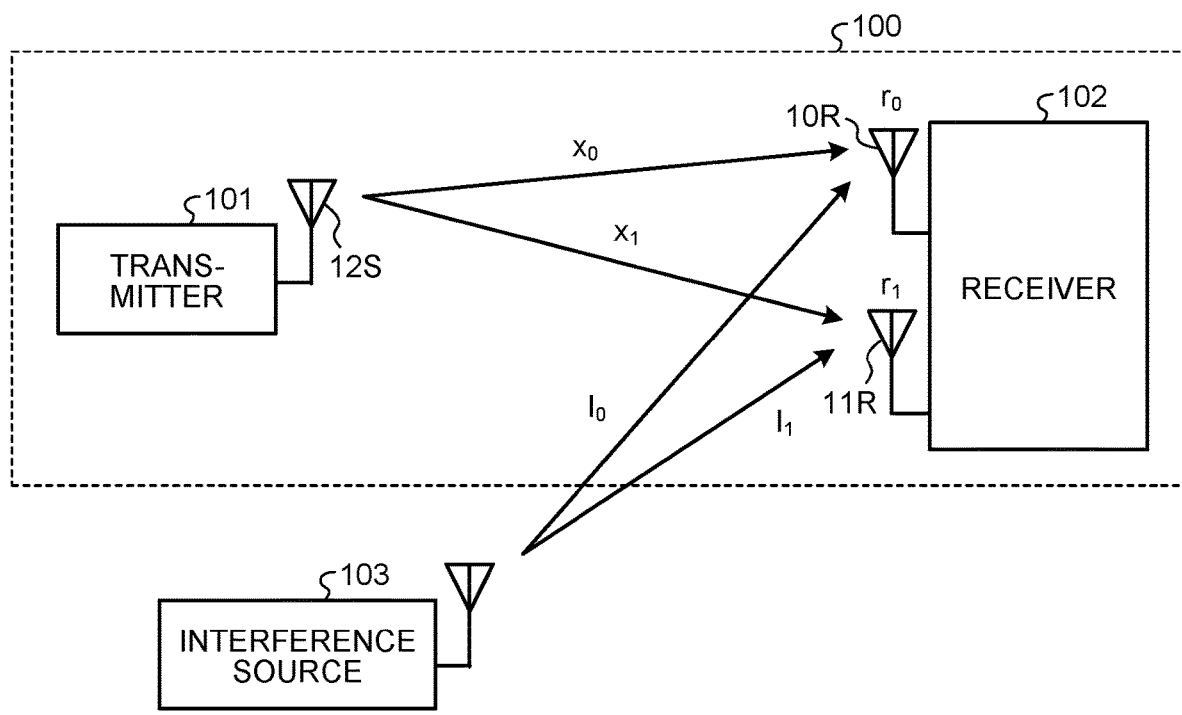
FIG. 1 is a diagram illustrating an overall configuration of a communication system according to an embodiment.

FIG. 1 is a diagram illustrating an overall configuration of a communication system according to an embodiment. A communication system 100 is a system that performs wireless communication. The communication system 100 includes a transmitter 101 that is a communication apparatus and a receiver 102 that is a communication apparatus. An interference source 103 is a communication apparatus of other communication system. The communication system 100 improves interference resistance performance while preventing demodulation performance degradation. Desired waves in the embodiment are desired signals included in reception signals. Interference waves in the embodiment are interference signals included in reception signals.

The embodiment describes, as an example, a case where the transmitter 101 transmits a signal from one transmitting antenna 12S, and the receiver 102 receives the signal by two receiving antennas 10R and 11R. The communication apparatus including the transmitter 101 may have a reception function. The communication apparatus including the receiver 102 may have a transmission function.

A signal transmitted from the transmitter 101 that is a transmitting apparatus passes through different communication channels (channels) and is received by the receiving antennas 10R and 11R of the receiver 102. The receiving antenna 10R receives the transmission signal as $x_0$, and the receiving antenna 11R receives the transmission signal as $x_1$.

It is assumed that the interference source 103 performs signal transmission processing as communication processing separately from the communication system 100. For the communication system 100, a signal transmitted by the interference source 103 is a communication signal of other system rather than the communication system 100 itself. The receiving antenna 10R receives the signal transmitted by the interference source 103 as an interference signal $I_0$, and the receiving antenna 11R receives the signal transmitted by the interference source 103 as an interference signal $I_1$.

Thus, a reception signal $r_0$ received by the receiving antenna 10R of the receiver 102 is the sum of the signal transmitted from the transmitter 101 and the signal transmitted from the interference source 103, and can be expressed as formula (1) below. Likewise, a reception signal $r_1$ received by the receiving antenna 11R of the receiver 102 is the sum of the signal transmitted from the transmitter 101 and the signal transmitted from the interference source 103, and can be expressed as formula (2) below.

$$r_0 = x_0 + I_0 \quad \text{(1)Formula 1}$$

$$r_1 = x_1 + I_1 \quad \text{(2)Formula 2}$$

The receiver 102 removes the interference signals $I_0$ and $I_1$ from the reception signals, thereby suppressing the influence of the interference signals $I_0$ and $I_1$ and achieving stable communication with high interference resistance. When suppressing interference, the receiver 102 measures interference power using null symbols or the like inserted into a transmission packet transmitted from the transmitter 101, and generates weights $w_0$ and $w_1$ to minimize the interference power. The receiver 102 calculates reception signals $r'_0$ and $r'_1$ obtained by multiplying the reception signals $r_0$ and $r_1$ received by the receiving antennas 10R and 11R by the weights $w_0$ and $w_1$. The reception signal $r'_0$ can be expressed as formula (3) below. The reception signal $r'_1$ can be expressed as formula (4) below.

$$r'_0 = w_0 x_0 + w_0 I_0 \quad \text{(3)Formula 3}$$

$$r'_1 = w_1 x_1 + w_1 I_1 \quad \text{(4)Formula 4}$$

The receiver 102 performs combining processing between the receiving antennas 10R and 11R (hereinafter, referred to as "between the receiving antennas") (hereinafter, referred to as inter-antenna combining) with respect to the reception signals $r'_0$ and $r'_1$ at the receiving antennas 10R and 11R obtained by multiplication by the weights $w_0$ and $w_1$. Consequently, the receiver 102 cancels the interference signals $I_0$ and $I_1$ out to achieve interference suppression. The result of the interference suppression by the inter-antenna combining can be expressed as formula (5) below.

$$r'_0 + r'_1 = w_0 x_0 + w_1 x_1 + w_0 I_0 + w_1 I_1 \quad \text{(5)Formula 5}$$

Figure 2:
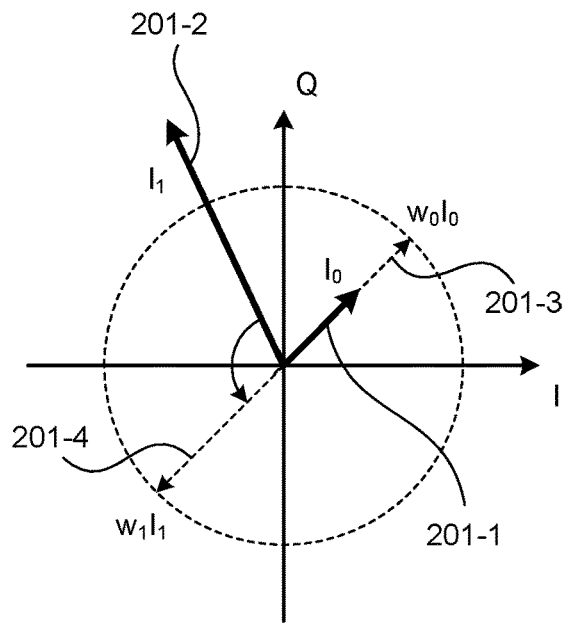
FIG. 2 is a diagram for explaining an example of interference waves received by a receiver according to the embodiment.
Figure 3:
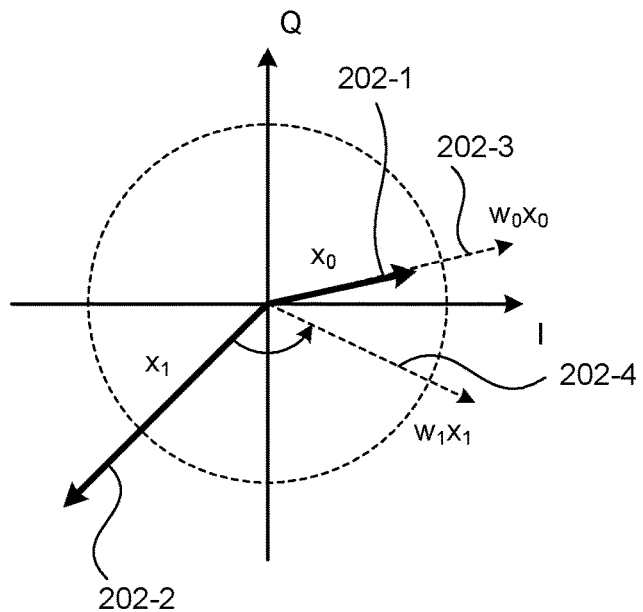
FIG. 3 is a diagram for explaining an example of desired waves which are not canceled out when combining reception signals between receiving antennas.

Here, interference suppression processing by the receiver 102 will be described. FIG. 2 is a diagram for explaining an example of interference waves received by the receiver according to the embodiment. FIG. 3 is a diagram for explaining an example of desired waves which are not canceled out when combining reception signals between the receiving antennas. In FIG. 2, interference signals that are interference wave signals are illustrated in a complex plane. In FIG. 3, desired wave signals are illustrated in a complex plane.

In FIG. 2, the interference signal $I_0$ received by the receiving antenna 10R is illustrated as an interference wave 201-1, and the interference signal $I_1$ received by the receiving antenna 11R is illustrated as an interference wave 201-2. In FIG. 2, the interference signal $w_0 I_0$ of the receiving antenna 10R obtained by multiplying the interference signal $I_0$ by the weight $w_0$ for interference suppression is illustrated as an interference wave 201-3, and the interference signal $w_1 I_1$ of the receiving antenna 11R obtained by multiplying the interference signal $I_1$ by the weight $w_1$ for interference suppression is illustrated as an interference wave 201-4.

In FIG. 3, the desired signal $x_0$ received by the receiving antenna 10R is illustrated as a desired wave 202-1, and the desired signal $x_1$ received by the receiving antenna 11R is illustrated as a desired wave 202-2. In FIG. 3, the desired signal $w_0 x_0$ of the receiving antenna 10R obtained by multiplying the desired signal $x_0$ by the weight $w_0$ for interference suppression is illustrated as a desired wave 202-3, and the desired signal $w_1 x_1$ of the receiving antenna 11R obtained by multiplying the desired signal $x_1$ by the weight $w_1$ for interference suppression is illustrated as a desired wave 202-4.

As illustrated in FIGS. 2 and 3, the receiver 102 multiplies the interference wave 201-1 and the desired wave 202-1 received by the receiving antenna 10R by the weight $w_0$. As a result, the interference wave 201-1 and the desired wave 202-1 become the interference wave 201-3 and the desired wave 202-3, respectively.

The receiver 102 multiplies the interference wave 201-2 and the desired wave 202-2 received by the receiving antenna 11R by the weight $w_1$. As a result, the interference wave 201-2 and the desired wave 202-2 become the interference wave 201-4 and the desired wave 202-4, respectively.

As illustrated in FIG. 2, the interference waves 201-1 and 201-2 before being multiplied by the weights $w_0$ and $w_1$ can be expressed as vectors of different amplitudes having a phase difference. By multiplying the interference wave 201-1 and the interference wave 201-2 of the receiving antennas 10R and 11R by the weight $w_0$ and the weight $w_1$, respectively, the receiver 102 can use the interference wave 201-3 and the interference wave 201-4 of the receiving antennas 10R and 11R as vectors of the same amplitude and the opposite phases. By combining the vectors of the opposite phases between the receiving antennas, the receiver 102 can cancel interference components out.

On the other hand, as illustrated in FIG. 3, the desired waves 202-1 and 202-2 also have a phase difference and are vectors of different amplitudes. By the receiver 102 multiplying the desired wave 202-1 and the desired wave 202-2 of the receiving antennas 10R and 11R by the weight $w_0$ and the weight $w_1$, respectively, the desired waves of the receiving antennas 10R and 11R become the desired waves 202-3 and 202-4. Since the weights $w_0$ and $w_1$ are weights to convert the two vectors of the interference waves 201-1 and 201-2 into those of the same amplitude and the opposite phases, the desired waves 202-3 and 202-4 obtained by multiplication by the weights $w_0$ and $w_1$ are not canceled out by the combining between the receiving antennas. Therefore, the receiver 102 can cancel only the interference signals (interference components) out and extract the desired signals, that is, desired components for demodulation processing.

Figure 4:
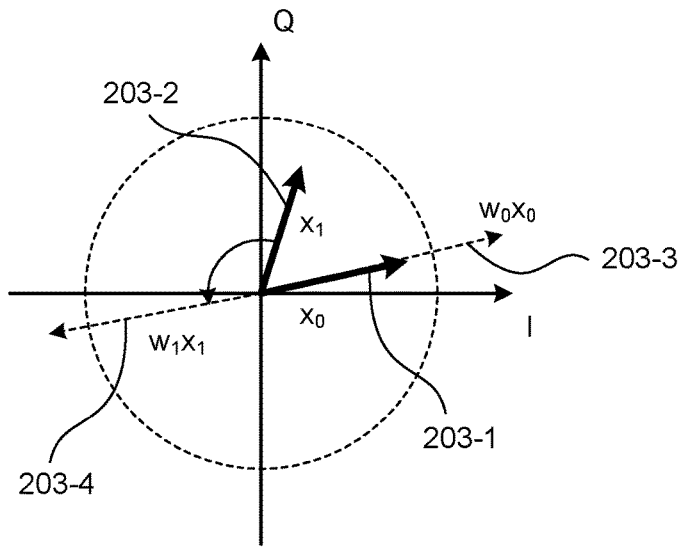
FIG. 4 is a diagram for explaining an example of desired waves which are canceled out when combining reception signals between the receiving antennas.

However, there are cases where desired components are canceled out at the same time as interference components are canceled out, resulting in that demodulation becomes impossible. FIG. 4 is a diagram for explaining an example of desired waves which are canceled out when combining reception signals between the receiving antennas. In FIG. 4, desired wave signals are illustrated in a complex plane.

In FIG. 4, the desired signal $x_0$ received by the receiving antenna 10R that becomes unable to be demodulated is illustrated as a desired wave 203-1, and the desired signal $x_1$ received by the receiving antenna 11R that becomes unable to be demodulated is illustrated as a desired wave 203-2. In FIG. 4, the desired signal $w_0 x_0$ of the receiving antenna 10R obtained by multiplying the desired signal $x_0$ by the weight $w_0$ for interference suppression is illustrated as a desired wave 203-3, and the desired signal $w_1 x_1$ of the receiving antenna 11R obtained by multiplying the desired signal $x_1$ by the weight $w_1$ for interference suppression is illustrated as a desired wave 203-4.

It is assumed that the interference waves 201-1 and 201-2 received by the receiving antennas 10R and 11R are the same as the interference waves 201-1 and 201-2 illustrated in FIG. 2. In this case, it is assumed that the relationship between the vectors of the desired waves 203-1 and 203-2 received by the receiving antennas 10R and 11R, particularly the phase difference between the two vectors is the same as that of the interference waves 201-1 and 201-2.

Suppose the receiver 102 performs the same processing as the processing illustrated in FIGS. 2 and 3 in this case. When the receiver 102 multiplies the reception signals by the weights $w_0$ and $w_1$ so as to perform interference suppression by inter-antenna combining, similarly to the processing described with reference to FIG. 2, the interference waves 201-3 and 201-4 come to have the opposite phases as a result of the multiplication by the weights $w_0$ and $w_1$. Consequently, the interference signals are canceled out by the inter-antenna combining, and an interference suppression effect can be obtained.

On the other hand, the desired waves 203-3 and 203-4 are also in an opposite-phase relationship by the same processing as the processing illustrated in FIG. 2. Consequently, when the receiver 102 performs inter-antenna combining, the desired waves 203-3 and 203-4 obtained by multiplication by the weights $w_0$ and $w_1$ cancel each other out. That is, like the interference waves 201-3 and 201-4, the desired waves 203-3 and 203-4 are also canceled out.

Thus, depending on the relationship between the amplitudes and the phase difference of the interference waves 201-1 and 201-2 and the amplitudes and the phase difference of the desired waves 203-1 and 203-2 of the receiving antennas 10R and 11R, there is a case where the desired waves received by the receiving antennas 10R and 11R weaken each other, that is, be canceled out at the same time as interference cancellation. When the receiver 102 performs such interference suppression processing, demodulation performance is degraded.

Therefore, in the embodiment, the receiver 102 performs reverse sequence multiplication processing on reception signals at the time of interference suppression to vary interference forms in the reception signals, and generates different weights for each combination of the reception signals on which to perform interference suppression. Then, the receiver 102 performs interference suppression using the weights for a combination by which desired wave components strengthen each other most, thereby preventing cancellation of the desired wave components that occurs depending on conditions at the time of interference component cancellation processing. As a result, the communication system 100 can prevent degradation of demodulation performance at the time of interference suppression, and achieve improvement of demodulation performance at the time of interference suppression.

Figure 5:
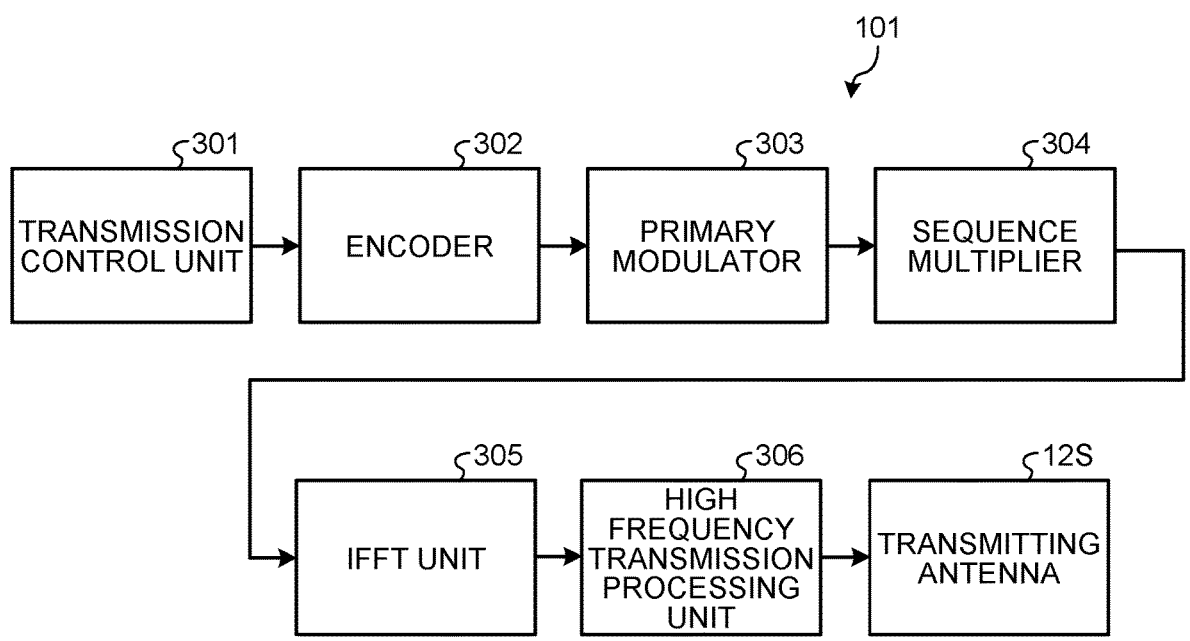
FIG. 5 is a diagram illustrating a configuration of a transmitter included in the communication system according to the embodiment.

Next, a configuration of the transmitter 101 according to the embodiment will be described. FIG. 5 is a diagram illustrating a configuration of the transmitter included in the communication system according to the embodiment.

The transmitter 101 includes a transmission control unit 301, an encoder 302, a primary modulator 303, a sequence multiplier 304, an inverse fast Fourier transform (IFFT) unit 305, a high frequency transmission processing unit 306, and a transmitting antenna 12S.

The transmission control unit 301 sends a signal transmission start command to the encoder 302. The encoder 302 encodes information bits of a signal, and sends the encoded signal to the primary modulator 303. The primary modulator 303 performs primary modulation on the signal. As a primary modulation scheme in the primary modulator 303, phase-shift keying (PSK) may be used as an example. The primary modulator 303 sends the signal that has undergone the primary modulation to the sequence multiplier 304.

The sequence multiplier 304 performs sequence multiplication processing on the signal modulated by the primary modulator 303. Here, a description is given of a case where the sequence multiplier 304 performs direct sequence processing as an example of the sequence multiplication processing. When the sequence multiplier 304 performs the direct sequence processing, a spreading sequence for the direct sequence processing and a spreading sequence length are, for example, a spreading sequence and a spreading sequence length determined in the communication system 100. By the sequence multiplier 304 performing the direct sequence processing, the bandwidth is widened by the spreading sequence length.

The direct sequence processing is processing to perform wideband modulation that is secondary modulation, using a pseudo random noise code (spreading code) generated by a pseudo random bit sequence, after narrowband modulation that is the primary modulation. The spreading code here is pseudorandom numbers in which "1" and "−1" randomly appear. Bits of the spreading code are called chips to be distinguished from bits of transmission data that is a baseband signal. Consequently, a modulated wave that has undergone the secondary modulation is changed in units of chips. The sequence multiplier 304 sends the signal on which the direct sequence processing has been performed to the IFFT unit 305.

The IFFT unit 305 performs an inverse fast Fourier transform on the signal that has undergone the direct sequence processing, and sends the signal to the high frequency transmission processing unit 306. The high frequency transmission processing unit 306 converts the signal that has undergone the modulation processing in the digital signal into an analog signal, and sends the analog signal to the transmitting antenna 12S. The transmitting antenna 12S transmits the analog signal.

Figure 6:
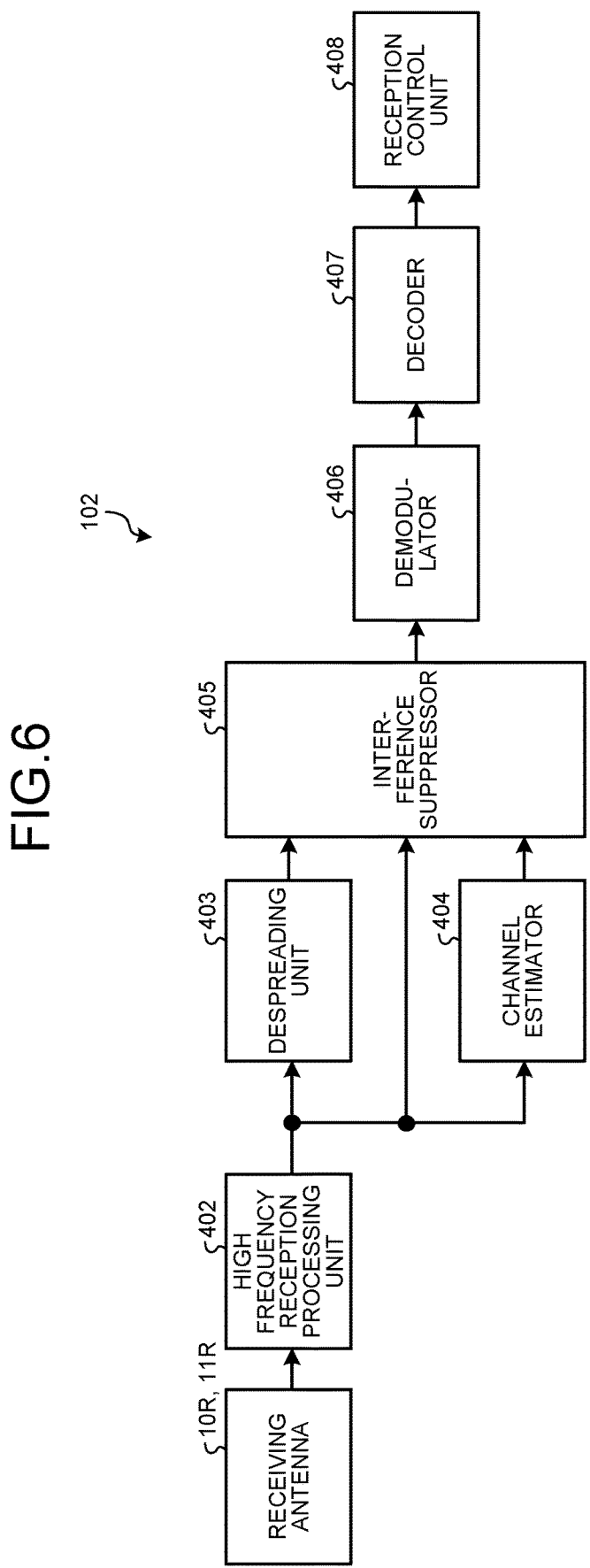
FIG. 6 is a diagram illustrating a configuration of the receiver included in the communication system according to the embodiment.

Next, a configuration of the receiver 102 according to the embodiment will be described. FIG. 6 is a diagram illustrating a configuration of the receiver included in the communication system according to the embodiment. The receiver 102 includes the receiving antennas 10R and 11R, a high frequency reception processing unit 402, a despreading unit 403, a channel estimator 404, an interference suppressor 405, a demodulator 406, a decoder 407, and a reception control unit 408.

The receiving antennas 10R and 11R send analog signals received to the high frequency reception processing unit 402. The high frequency reception processing unit 402 adjusts the levels of the received analog signals, converts the frequencies into baseband, and converts the analog signals into digital signals. After converting the analog signals into the digital signals, the high frequency reception processing unit 402 sends the digital signals to the despreading unit 403, the interference suppressor 405, and the channel estimator 404. The digital signals sent from the high frequency reception processing unit 402 to the despreading unit 403 are digital signals to be demodulated by despreading. The digital signals sent from the high frequency reception processing unit 402 to the interference suppressor 405 are digital signals on which despreading is not performed.

The despreading unit 403 performs despreading processing, that is, multiplies the digital signals received from the high frequency reception processing unit 402 by a sequence having reverse characteristics to the spreading sequence at the time of the direct sequence processing at the transmission end. The despreading unit 403 sends, to the interference suppressor 405, the signals on which the despreading processing has been performed.

When the receiver 102 uses, for example, synchronous detection as a detection method, it is necessary to determine a channel response in each communication channel. Here, an example of channel response estimation processing will be described. To estimate a channel response, for example, the transmitter 101 inserts a pilot signal into a transmission packet and transmits the transmission packet, and the receiver 102 extracts the pilot signal from the transmission packet and estimates a channel response. Specifically, the channel estimator 404 extracts pilot signals from the digital signals received from the high frequency reception processing unit 402, and estimates channel values indicating channel responses based on the pilot signals. The channel estimator 404 sends the estimated channel responses to the interference suppressor 405.

The interference suppressor 405 suppresses only the interference signal of the reception signals and extracts only the desired signal, based on the signals received from the high frequency reception processing unit 402, the despreading unit 403, and the channel estimator 404. The interference suppressor 405 sends the extracted desired signal to the demodulator 406.

The demodulator 406 performs demodulation processing on the desired signal received from the interference suppressor 405, and sends the desired signal to the decoder 407. The decoder 407 performs decoding processing on the signal received from the demodulator 406, and sends the signal to the reception control unit 408. The reception control unit 408 controls various operations using the signal received from the decoder 407.

Figure 7:
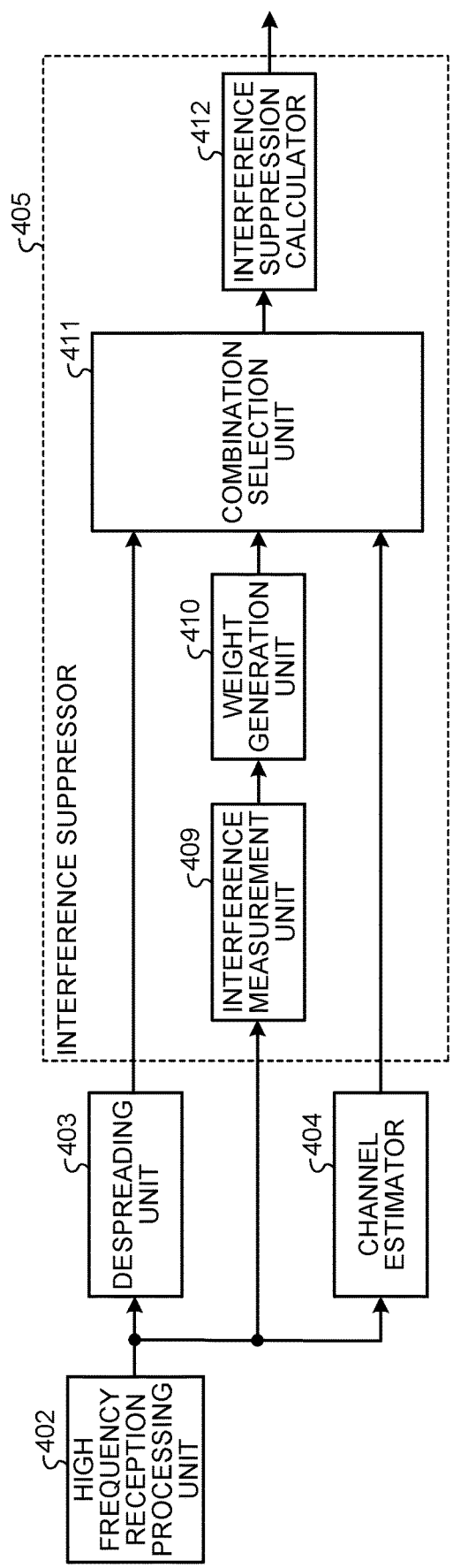
FIG. 7 is a diagram illustrating a configuration of an interference suppressor included in the receiver according to the embodiment.

Here, a configuration example of the interference suppressor 405 will be described. FIG. 7 is a diagram illustrating a configuration of the interference suppressor included in the receiver according to the embodiment. The interference suppressor 405 is connected to the high frequency reception processing unit 402, the despreading unit 403, and the channel estimator 404.

The interference suppressor 405 includes an interference measurement unit 409, a weight generation unit 410, a combination selection unit 411, and an interference suppression calculator 412.

The interference measurement unit 409 receives, from the high frequency reception processing unit 402, the signals processed by the high frequency reception processing unit 402, which are the signals before dispreading. The interference measurement unit 409 measures the amounts of interference of the signals included in the reception signals. To measure the amounts of interference, for example, the transmitter 101 disposes null symbols in a transmission packet. Since each null symbol has a value of "0" at the time of transmission, a value measured by the interference measurement unit 409 can be said to be the amount of interference at the time and frequency at which the null symbol is disposed. The amount of interference measured is used as the amount of interference with information symbols around the null symbol. The interference measurement unit 409 sends the amounts of interference measured to the weight generation unit 410.

The weight generation unit 410 calculates weights to minimize the interference signal, based on the amounts of interference. Specifically, the weight generation unit 410 calculates weights to minimize the interference signal by determining correlation values based on the characteristics of the respective reception signals, and sends the calculated weights to the combination selection unit 411.

The combination selection unit 411 receives the weights for minimizing the interference signal from the weight generation unit 410. In addition, the combination selection unit 411 receives the signals on which the despreading processing has been performed from the despreading unit 403, and receives the estimated channel responses from the channel estimator 404. The combination selection unit 411 selects a combination of reception signals (e.g., chips) on which inter-antenna combining in the interference suppression processing is performed. The combination selection unit 411 sends the selected combination to the interference suppression calculator 412.

According to the chip combination on which to inter-antenna combining is performed, the interference suppression calculator 412 performs interference suppression calculation by multiplying the receiving antennas 10R and 11R by the weights generated by the weight generation unit 410, and performing inter-antenna combining. Thus, the interference suppression calculator 412 performs interference suppression.

Figure 8:
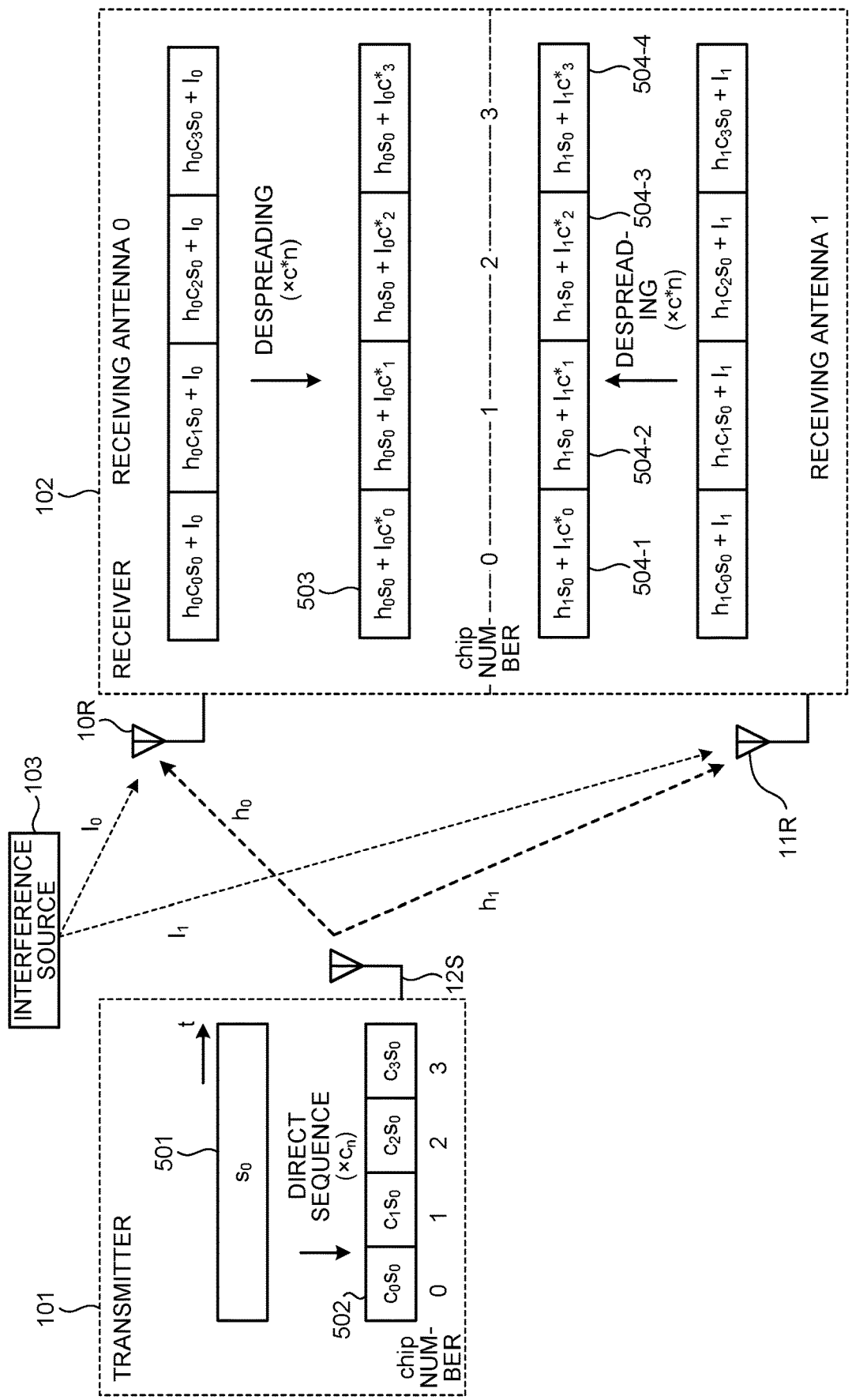
FIG. 8 is a diagram for explaining outlines of transmission processing and reception processing in the communication system according to the embodiment.

Here, an outline of transmission processing by the transmitter 101 and an outline of reception processing by the receiver 102 will be described. FIG. 8 is a diagram for explaining outlines of the transmission processing and the reception processing in the communication system according to the embodiment. Hereinafter, the receiving antenna 10R may be referred to as a receiving antenna 0, and the receiving antenna 11R as a receiving antenna 1.

The transmitter 101 performs the direct sequence processing on a transmission symbol 501 for transmission. Chips 502 are chips obtained by the transmitter 101 performing the direct sequence processing on the transmission symbol 501. A chip 503, a chip 504-1, a chip 504-2, a chip 504-3, and a chip 504-4 are chips obtained by the despreading unit 403 despreading the chips 502 that have been received by the receiver 102.

The chip 503 is the zeroth chip of the receiving antenna 0 (receiving antenna 10R) despread by the despreading unit 403. For the first to third chips of the receiving antenna 0 despread by the despreading unit 403, reference numerals are not illustrated.

The chip 504-1 is the zeroth chip of the receiving antenna 1 (receiving antenna 11R) despread by the despreading unit 403. The chip 504-2 is the first chip of the receiving antenna 1 despread by the despreading unit 403. The chip 504-3 is the second chip of the receiving antenna 1 despread by the despreading unit 403. The chip 504-4 is the third chip of the receiving antenna 1 despread by the despreading unit 403.

Here, a case where the transmitter 101 performs the direct sequence processing on one symbol so for transmission will be described as an example of the transmission processing. For example, when the spreading sequence length of the direct sequence processing is a sequence length of four, and the spreading sequence of the n-th (n is a natural number) chip is a spreading sequence $c_n$ (0≤n≤3), the sequence multiplier 304 of the transmitter 101 generates the chips 502 by multiplying the transmission symbol 501 by the spreading sequence $c_n$ with each chip number. A transmission signal of the chips 502 is transmitted from the transmitting antenna 12S.

When the receiver 102 receives the transmission signal of the chips 502 by the two antennas, namely the receiving antenna 0 and the receiving antenna 1, the transmission signal is subjected to communication channels $h_0$ and $h_1$. In addition, the interference signal communicated by the interference source 103 is received as $I_0$ and $I_1$ at the receiving antennas 0 and 1, respectively. Thus, reception signals $r_{0_n}$ and $r_{1_n}$ of each chip of the receiving antennas 0 and 1 can be expressed as formulas (6) and (7) below, respectively.

$$r_{0_n} = h_0 c_n s_0 + I_0 \quad \text{(6) Formula 6}$$

$$r_{1_n} = h_1 c_n s_0 + I_1 \quad \text{(7) Formula 7}$$

The despreading unit 403 performs the despreading processing on the signals received by the receiving antennas 0 and 1. The despreading unit 403 performs the despreading processing by multiplying the signals by the complex conjugate $c^*_n$ (* represents a complex conjugate) of the spreading sequence $c_n$ which has been used by the sequence multiplier 304 for the multiplication at the time of transmission. The reception signals $r_{0_n}$ and $r_{1_n}$ of each chip of the receiving antennas 0 and 1 that have undergone the despreading processing can be expressed as formulas (8) and (9) below, respectively.

$$r_{0_n} = h_0 s_0 + I_0 c_n^* \quad \text{(8) Formula 8}$$

$$r_{1_n} = h_1 s_0 + I_1 c_n^* \quad \text{(9) Formula 9}$$

The despreading unit 403 inputs the reception signals on which the despreading processing has been performed to the combination selection unit 411 of the interference suppressor 405. The combination selection unit 411 selects a chip combination to be used for interference suppression. The interference suppression calculator 412 performs interference suppression using the selected combination. When performing interference suppression, the interference suppression calculator 412 first multiplies the reception signals of the receiving antennas 0 and 1 by the weights $w_0$ and $w_1$ for minimizing interference components in combining between the receiving antennas, as shown in formulas (3) and (4). The reception signals of each chip of the receiving antennas 0 and 1 multiplied by the weights $w_0$ and $w_1$ can be expressed as formulas (10) and (11) below, respectively. Here, the weights $w_0$ and $w_1$ are weights calculated by the weight generation unit 410.

$$r'_{0_n} = w_0 h_0 s_0 + w_0 I_0 c_n^* \quad \text{(10) Formula 10}$$

$$r'_{1_n} = w_1 h_1 s_0 + w_1 I_1 c_n^* \quad \text{(11) Formula 11}$$

The interference suppression calculator 412 performs inter-antenna combining by combining formulas (10) and (11) obtained by multiplying the reception signals of the receiving antennas 0 and 1 by the weights $w_0$ and $w_1$, to cancel the interference signals out. The combination for interference suppression is determined by selecting which chips to be used for the same symbol at the respective receiving antennas 0 and 1 at the time of the inter-antenna combining.

For example, the spreading sequence length of the direct sequence processing is set to a sequence length of four, and two receiving antennas, namely the receiving antennas 0 and 1, are used as receiving antennas. In this case, a description is given of a processing example of processing to select, for the zeroth chip 503 at the receiving antenna 0, with which chip among total four chips, namely from the zeroth chip to the third chip, at the receiving antenna 1 so as to perform inter-antenna combining in the interference suppression processing. Chips from the zeroth chip to the third chip at the receiving antenna 1 are the chip 504-1, the chip 504-2, the chip 504-3, and the chip 504-4, respectively.

Figure 9:
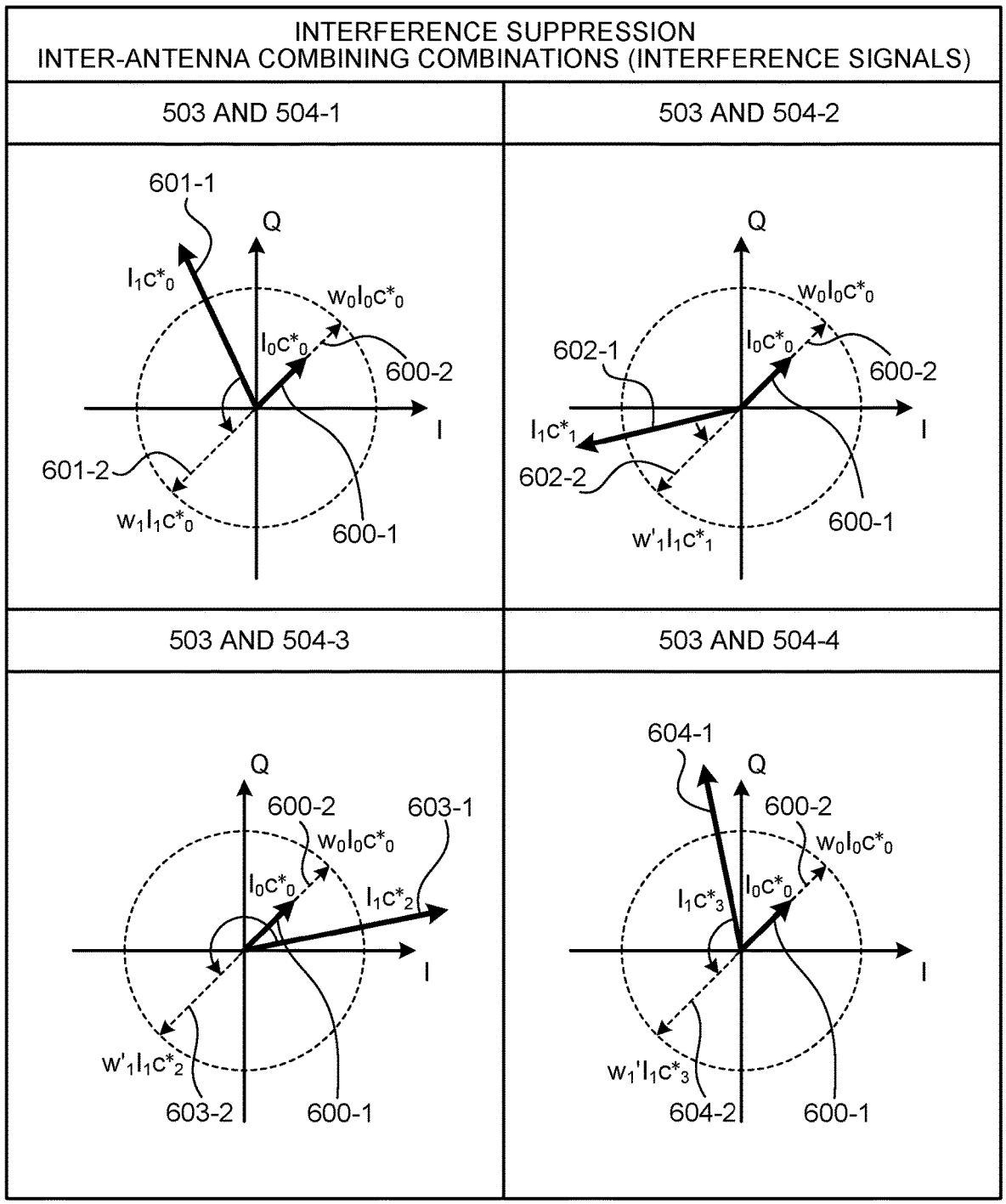
FIG. 9 is a diagram illustrating interference signals corresponding to combinations between chips, which are calculated by the communication system, according to the embodiment.
Figure 10:
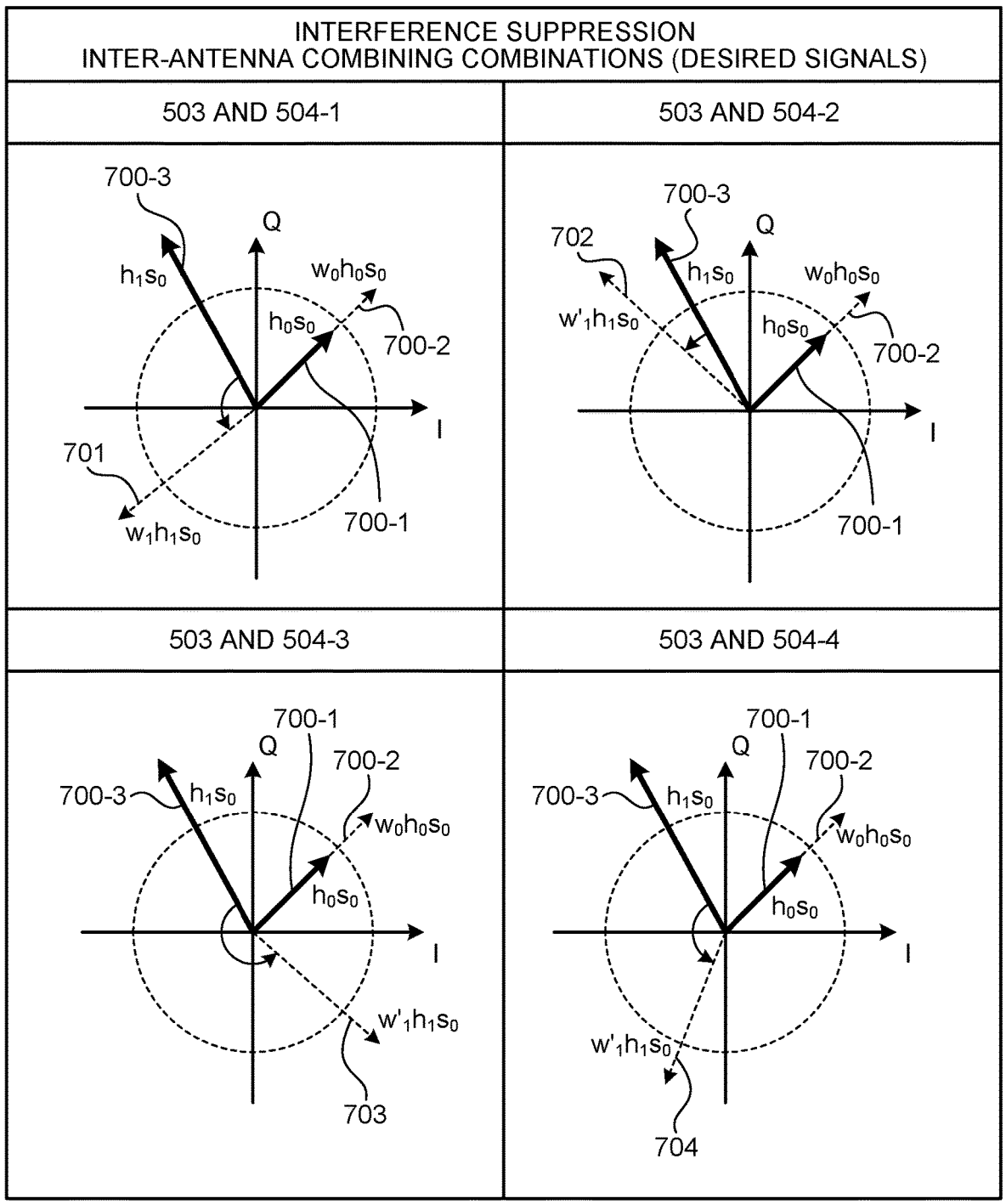
FIG. 10 is a diagram illustrating desired signals corresponding to the combinations between the chips, which are calculated by the communication system, according to the embodiment.

FIG. 9 is a diagram illustrating interference signals corresponding to combinations between the chips, which are calculated by the communication system, according to the embodiment. FIG. 10 is a diagram illustrating desired signals corresponding to the combinations between the chips, which are calculated by the communication system, according to the embodiment.

FIG. 9 illustrates, in a complex plane, the interference signals when the interference suppression calculator 412 performs inter-antenna combining (interference suppression) between the zeroth chip at the receiving antenna 0 and each chip at the receiving antenna 1.

FIG. 10 illustrates, in a complex plane, the desired signals when the interference suppression calculator 412 performs inter-antenna combining between the zeroth chip at the receiving antenna 0 and each chip at the receiving antenna 1.

Based on the interference signals and the desired signals illustrated in FIGS. 9 and 10, the combination selection unit 411 selects a chip combination with which interference suppression is performed. The interference suppression calculator 412 performs the interference suppression processing with the selected combination. Here, a description is given of the reason why performance at the time of interference suppression is improved by performing the interference suppression processing with the selected combination, and an example of a method of selecting a chip combination.

FIG. 9 illustrates interference terms 600-1, 600-2, 601-1, 601-2, 602-1, 602-2, 603-1, 603-2, 604-1, and 604-2. The interference term 600-1 indicates the interference term $I_0 c^*_0$ of the zeroth chip 503 at the receiving antenna 0. The interference term 600-2 is an interference term obtained by multiplying the interference term 600-1 by the weight. That is, the interference term 600-2 indicates the interference term $w_0 I_0 c^*_0$ of the zeroth chip 503 multiplied by the weight at the receiving antenna 0.

The interference term 601-1 indicates the interference term $I_1 c^*_0$ of the zeroth chip 504-1 at the receiving antenna 1. The interference term 601-2 is an interference term obtained by multiplying the interference term 601-1 by the weight. That is, the interference term 601-2 indicates the interference term $w_1 I_1 c^*_0$ of the zeroth chip 504-1 multiplied by the weight at the receiving antenna 1.

The interference term 602-1 indicates the interference term $I_1 c^*_1$ of the first chip 504-2 at the receiving antenna 1. The interference term 602-2 is an interference term obtained by multiplying the interference term 602-1 by the weight. That is, the interference term 602-2 indicates the interference term $w'_1 I_1 c^*_1$ of the first chip 504-2 multiplied by the weight at the receiving antenna 1. The weight w' is a weight obtained by correcting the weight w.

The interference term 603-1 indicates the interference term $I_1 c^*_2$ of the second chip 504-3 at the receiving antenna 1. The interference term 603-2 is an interference term obtained by multiplying the interference term 603-1 by the weight. That is, the interference term 603-2 indicates the interference term $w'_1 I_1 c^*_2$ of the second chip 504-3 multiplied by the weight at the receiving antenna 1.

The interference term 604-1 indicates the interference term $I_1 c^*_3$ of the third chip 504-4 at the receiving antenna 1. The interference term 604-2 is an interference term obtained by multiplying the interference term 604-1 by the weight. That is, the interference term 604-2 indicates the interference term $w'_1 I_1 c'_3$ of the third chip 504-3 multiplied by the weight at the receiving antenna 1. The detailed reason why the weight by which the chips 504-2 to 504-4 are multiplied is $w'_1$ will be described later.

FIG. 10 illustrates signal terms 700-1, 700-2, 700-3, and 701 to 704. The signal term 700-1 indicates the signal term $h_0 s_0$ of the zeroth chip 503 at the receiving antenna 0. The signal term 700-2 indicates the signal term $w_0 h_0 s_0$ of the zeroth chip 503 multiplied by the weight at the receiving antenna 0. The signal term 700-3 indicates the signal term $h_1 s_0$ of the zeroth chip 504-1 and the first chip 504-2 at the receiving antenna 1.

The signal term 701 indicates the signal term $w_1 h_1 s_0$ of the zeroth chip 504-1 multiplied by the weight at the receiving antenna 1. The signal term 702 indicates the signal term $w'_1 h_1 s_0$ of the first chip 504-2 multiplied by the weight at the receiving antenna 1. The signal term 703 indicates the signal term $w'_1 h_1 s_0$ of the second chip 504-3 multiplied by the weight at the receiving antenna 1. The signal term 704 indicates the signal term $w'_1 h_1 s_0$ of the third chip 504-4 multiplied by the weight at the receiving antenna 1. The detailed reason why the weight by which the signal terms 702 to 704 of 504-2 to 504-4 are multiplied is $w'_1$ will be described later.

The following describes a case where the interference suppression processing is performed using the zeroth chip 503 of the receiving antenna 0 and the zeroth chip 504-1 of the receiving antenna 1, that is, chips of the same number between the receiving antennas. In this case, the results of weighting the reception signals of the receiving antennas 0 and 1 can be expressed by formulas (10) and (11) in which n=0, respectively. The interference suppression calculator 412 performs inter-antenna combining by combining formulas (10) and (11). The result of combining formulas (10) and (11) in this case, that is, the result of inter-antenna combining can be expressed by formula (12).

$$r'_{00}+r'_{10}=(w_0 h_0+w_1 h_1)s_0+(w_0 I_0+w_1 I_1)c^*_0 \quad (12) \text{Formula 12}$$

The third term and the fourth term on the right side of formula (12), which are interference terms, are canceled out by the combining and thus become zero, and the interference signals are canceled out. That is, $(w_0 I_0+w_1 I_1) c^*_0$ in formula (12) is zero. This can also be confirmed in FIG. 9 because when the interference signals that have undergone despreading have the relationship between the interference term 600-1 at the receiving antenna 0 and the interference term 601-1 at the receiving antenna 1, the interference signals that have been multiplied by the weights have the relationship between the interference term 600-2 at the receiving antenna 0 and 601-2 at the receiving antenna 1, and have the relationship of the same amplitude and the opposite phases.

Likewise, the signal terms of desired wave signals, that is, the first term and the second term on the right side of formula (12), which are desired wave terms, are multiplied by the weights at the receiving antennas 0 and 1 to perform inter-antenna combining. The desired wave signals in this case are illustrated in the part "503 and 504-1" in FIG. 10. That is, when the signal terms of the desired wave signals that have undergone despreading have the relationship between the signal term 700-1 at the receiving antenna 0 and the signal term 700-3 at the receiving antenna 1, the signal terms of the desired wave signals that have been multiplied by the weights have the relationship between the signal term 700-2 at the receiving antenna 0 and the signal term 701 at the receiving antenna 1. In this case, the signal terms 700-2 and 701 have an opposite-phase relationship, that is, a relationship in which the phases weaken each other, so that the desired wave signals are also canceled out. In this case, although the interference is suppressed, the desired waves are also canceled out at the same time, and demodulation becomes impossible.

Next, a description is given of a case where the interference suppression processing is performed using the zeroth chip 503 of the receiving antenna 0 and the first chip 504-2 of the receiving antenna 1, namely those are chips with different numbers between the receiving antennas.

In this case, the results of weighting the reception signals of the receiving antennas 0 and 1 can be expressed by formula (10) in which n=0 and formula (11) in which n=1, respectively. The result of combining formulas (10) and (11) in this case, that is, the result of inter-antenna combining can be expressed by formula (13).

$$r'_{00}+r'_{10}=(w_0 h_0+w_1 h_1)s_0+w_0 I_0 c^*_0+w_1 I_1 c^*_1 \quad (13) \text{Formula 13}$$

Focusing on the interference terms in formula (13), since combining is performed between the chips with the different numbers, the terms are multiplied by the different spreading sequences $c^*_0$ and $c^*_1{}^*$. Consequently, the interference terms remain due to the influence of the multiplication by the different spreading sequences between the receiving antennas, and the interference suppression is insufficient. This is because, unlike the case where the interference suppression processing with chips with the same number is performed between the receiving antennas, when interference suppression with chips with different numbers is performed, the relationship between the interference signals varies by an amount of the difference between the different chip spreading sequences before and after the despreading processing, so that the interference forms change. However, the spreading sequence $c_n$ is a known sequence in the communication system 100. Therefore, the receiver 102 regenerates, at the weight generation unit 410, the weight $w'_1$ which is corrected for the amount of the variation of the spreading sequences between different chips on which to perform the interference suppression processing, based on the weight $w_1$, and uses the weight $w'_1$ to enable the interference suppression processing.

Here, an example of a method of regenerating the weight will be described. Here, a description is given of a case where the receiver 102 uses, as the spreading sequence, a Zadoff-Chu (ZC) sequence, which is one of Constant Amplitude Zero Auto Correlation (CAZAC) sequences that are chirp signals.

Since a ZC sequence has a constant amplitude envelope (constant amplitude), the spreading sequences $c^*_0$ and $c^*_1$ of the different chips can be said to be sequences different only in phase relationship. Thus, the weight generation unit 410 regenerates the weight $w'_1$ obtained by correcting the weight $w_1$ for the phase difference between the spreading sequences $c^*_0$ and $c^*i$. Then, by using the corrected weight $w'_1$ as the weight for the interference suppression processing, the interference suppression calculator 412 can cancel the interference signals out. The result of performing, by the interference suppression calculator 412, weight multiplication and inter-antenna combining, using the corrected weight $w'_1$ is shown in formula (14) below.

$$r'_{00}+r'_{10}=(w_0h_0+w'_1h_1)s_0+w_0I_0c^*_0+w'_1I_1c^*_1 \quad (14)\text{Formula 14}$$

In FIG. 9, when the interference signals that have undergone despreading have the relationship between the interference term 600-1 at the receiving antenna 0 and the interference term 602-1 at the receiving antenna 1, the interference signals that have been multiplied by the weights have the relationship between 600-2 at the receiving antenna 0 and 602-2 at the receiving antenna 1.

For example, when different chips, such as the zeroth chip at the receiving antenna 0 and the first chip at the receiving antenna 1, are used, the interference suppression calculator 412 uses the regenerated weight $w'_1$, so that the interference signals of the receiving antennas 0 and 1 have the same-amplitude and opposite-phase relationship, and the interference can be suppressed.

On the other hand, as shown in formulas (12) and (13), the signal terms, which are the desired wave terms, are always the same signal terms (the signal term 700-1 and the signal term 700-3 also having the same relationship between the receiving antennas), regardless of a chip combination on which to perform the interference suppression processing. This is because the despreading unit 403 performs the despreading processing on the reception signals, so that the signal terms are not subject to variation due to the spreading sequence. On the other hand, the interference terms are subject to variation due to the spreading sequence by despreading, so that it is necessary to regenerate the weight $w'_1$ to cancel the interference out.

As shown in formula (14), the weight by which the desired wave term is multiplied is also changed from $w_1$ to $w'_1$, that is, becomes a weight corrected for the phase difference between the spreading sequences $c^*_0$ and $c^*_1$. Consequently, in FIG. 10, the desired wave signals that have undergone despreading remain in the relationship between the signal term 700-1 at the receiving antenna 0 and the signal term 700-3 at the receiving antenna 1. However, when different chips are used, the desired wave signal that has been multiplied by the weight varies from chip combination to chip combination. For example, when the first chip of the receiving antenna 1 is used, the desired wave signals that have been multiplied by the weights have the relationship between the signal term 700-2 at the receiving antenna 0 and the signal term 702 at the receiving antenna 1. This relationship is a relationship in which the phase relationship strengthens, that is, the desired wave signals do not weaken each other.

As described above, when the receiver 102 uses chips with the same number between the receiving antennas in the interference suppression processing, desired wave signals are also cancelled out at the same time as interference signals are cancelled out. Using chips with different numbers allows only interference signals to be cancelled out. Consequently, the receiver 102 can improve performance at the time of interference suppression.

In particular, since a chirp signal has a characteristic in that the frequency linearly changes with time, the phase difference, that is, the amount of phase rotation when viewed between chips in the direct sequence processing is also not a constant value. For example, for an up-chirp in which the frequency linearly increases with time, the phase difference (frequency) between chips increases. Thus, the receiver 102 can cause different chip combinations to have different phase differences, so that the weight $w'_1$ to be corrected can also be set to different values, which is advantageous in that it becomes easier to find a relationship in which desired waves strengthen each other.

Not only the first chip 504-2 of the receiving antenna 1, the receiver 102 can also perform the interference suppression processing between the zeroth chip 503 of the receiving antenna 0 and the second chip 504-3 or the third chip 504-4 of the receiving antenna 1. Processing in this case is the same as the processing described above. That is, based on the weight $w_1$, the receiver 102 generates the weight $w'_1$ corrected for the respective variations in the spreading sequences between different chips, to perform weight multiplication and inter-antenna combining. The same applies to the first to third chips of the receiving antenna 0.

Here, a description is given of an example of processing in which the combination selection unit 411 selects a chip combination on which to perform the interference suppression processing. The relationship of desired wave signals between the receiving antennas is affected by the channels $h_0$ and $h_1$.

Therefore, the combination selection unit 411 acquires the estimation results from the channel estimator 404, and selects a combination by which the phase relationship and the amplitude relationship between the desired wave terms to be strengthened most when all combinations for the interference suppression processing are multiplied by the weight $w'_1$. That is, the combination selection unit 411 selects, from all combinations for the interference suppression processing, a combination that can prevent the degradation of demodulation performance of desired wave term most when the reception signal of each chip is multiplied by the weight $w'_1$.

As described above, the communication system 100 according to the present embodiment performs the despreading processing on received signals to cancel only interference components out to perform interference suppression without degrading demodulation performance, regardless of the relationships between desired waves and interference waves.

Next, a supplementary explanation is given to clarify the difference between the communication system 100 of the present embodiment and a communication system of a comparative example. When performing interference suppression, the communication system of the comparative example generates weights, based on measured interference power, and cancels interference signals out by inter-antenna combining. In this case, the communication system of the comparative example also performs the same processing on desired signals, so that the desired signals may also be canceled out together with the interference signals, depending on the relationships between the desired signals and the interference signals, that is, the relationship between the weights, degrading demodulation performance.

On the other hand, the communication system 100 of the present embodiment utilizes the direct sequence processing as the sequence multiplication processing at the time of transmission. Thus, the communication system 100 performs the despreading processing as the reverse sequence multiplication processing on the reception side, to vary interference forms in reception signals of each chip. The weight generation unit 410 generates weights used for the interference suppression processing for each chip combination.

The combination selection unit 411 selects a chip combination between the receiving antennas by which only interference signals are canceled out and desired wave signals can be extracted, based on channel estimate values, which are the estimate values of the channel responses estimated by the channel estimator 404, and the relationship between the weights generated by the weight generation unit 410. Then, the interference suppression calculator 412 performs inter-antenna combining, according to the selected chip combination, thereby performing interference suppression while preventing demodulation performance degradation.

Note that the present embodiment has illustrated the case where the transmitter 101 includes one transmitting antenna, and the receiver 102 includes two receiving antennas, but the present embodiment is not limited thereto. For example, when the transmitter 101 performs transmit diversity using two or more transmitting antennas, the same effect as that when the transmitter 101 uses one transmitting antenna can be obtained.

Furthermore, when the receiver 102 includes three or more receiving antennas, the same effect as that when the receiver 102 includes two receiving antennas can be obtained. In addition, in the receiver 102, an increased number of receiving antennas results in increased options for the weights in the interference suppression processing and the combination of chips to be used in antenna combining, thus allowing a further reduction of the influence of performance degradation at the time of interference suppression.

The present embodiment has described the example in which the sequence multiplier 304 performs the direct sequence processing as an example of sequence multiplication, but the present embodiment is not limited thereto. For example, the transmitter 101 may duplicate a symbol to be transmitted a plurality of times, and multiply the duplicated symbols by a sequence to give different initial phases for transmission. That is, the transmitter 101 may successively transmit the same symbols of different initial phases.

In addition to multiplying duplicated symbols by a sequence to give different initial phases, the transmitter 101 may further shift the respective frequencies of the symbols. In this case, the transmitter 101 simultaneously transmits the symbols of the different initial phases at different frequencies at the same time, that is, by frequency multiplexing.

In addition to multiplying duplicated symbols by a sequence to give different initial phases, the transmitter 101 may perform direct sequence processing by multiplying these symbols by different spreading sequences, and transmit the same symbols of the different initial phases by code multiplexing.

The present embodiment has described the case where the combination selection unit 411 selects a combination for interference suppression among chips of the same symbol of the receiving antennas 0 and 1. In a case where the transmitter 101 performs successive transmission, frequency multiplexing, or code multiplexing described above, the combination selection unit 411 selects a combination for interference suppression among the same symbols of different initial phases that have been successively transmitted or frequency- or code-multiplexed. In these cases, processing performed by the combination selection unit 411 is the same as the processing described with reference to FIGS. 7 to 10.

The present embodiment has described the processing in which the weight generation unit 410 regenerates a weight that takes into consideration spreading sequence variation between different chips, which is performed at the time of suppressing interference between the chips. In a case where the transmitter 101 performs successive transmission, frequency multiplexing, or code multiplexing described above, the weight generation unit 410 regenerates a weight that takes into consideration a difference in initial phase between different symbols. In these cases, processing performed by the weight generation unit 410 is the same as the processing described with reference to FIGS. 7 to 10.

Thus, the receiver 102 can implement the same processing as the processing described with reference to FIGS. 7 to 10 with the same configuration as the configuration described with reference to FIGS. 6 and 7, and can obtain the same effect as the effect described with reference to FIGS. 7 to 10.

The present embodiment has described the case where the spreading sequence and the spreading sequence length with which the sequence multiplier 304 performs the direct sequence processing are determined in the communication system 100, but the present embodiment is not limited thereto. For example, the communication system 100 may store different spreading sequences and spreading sequence lengths. In this case, the receiver 102 estimates interference forms corresponding to weights between the receiving antennas, based on the results of processing in the weight generation unit 410 and the channel estimator 404. Then, the receiver 102 feeds back the estimate values of channel responses estimated, selects an appropriate spreading sequence and spreading sequence length, to perform the despreading processing. That is, the receiver 102 selects an appropriate spreading sequence and spreading sequence length, based on the interference forms estimated from the weights and the estimate values of the channel responses between the receiving antennas, to perform the despreading processing. The receiver 102 may determine a spreading sequence and a spreading sequence length after estimating communication channels and interference forms, based on estimation results for a plurality of times.

The present embodiment has described the case where the spreading sequence length is four when the despreading unit 403 and the interference suppressor 405 perform the despreading processing, but the present embodiment is not limited thereto. The spreading sequence length is not limited to a sequence length of four, and any configuration is possible. The longer the spreading sequence length, the more the number of combinations for the interference suppression processing increases, and thus the more the number of options in the combination selection unit 411 can be increased.

On the other hand, if the spreading sequence length is made too long, variation of interference forms increases in the spreading sequence (the time direction). Thus, the spreading sequence length needs to be set to an appropriate length. Therefore, the receiver 102 observes the amount of variation of the weights (interference) for a plurality of times, for example. When the amount of variation is small, the receiver 102 determines that an interference signal from the outside of the communication system 100 is constantly received. In this case, the receiver 102 may use a long spreading sequence length to increase the number of options in the combination selection unit 411. On the other hand, when weight variation occurs greatly within a short time, the receiver 102 may use a short spreading sequence length.

The present embodiment has described the method of regenerating a weight when the weight generation unit 410 uses a ZC sequence that is a chirp signal as the spreading sequence, but the present embodiment is not limited thereto. The spreading sequence used by the weight generation unit 410 is not limited to a ZC sequence, and any spreading sequence can be used.

For example, the weight generation unit 410 may use a Walsh-Hadamard sequence or a pseudo-noise (PN) sequence as the spreading sequence. A Walsh-Hadamard sequence is a sequence having a value of "1" or "−1". Compared with a chirp signal, a phase difference between chips is limited to 0° or 180°. In a case where the weight generation unit 410 uses a Walsh-Hadamard sequence, if desired waves have a relationship in which they weaken each other at the time of the interference suppression processing between chips of the same spreading sequence (for example, both of the receiving antennas 0 and 1 have the spreading sequence "1"), by performing the interference suppression processing between chips having different spreading sequences (for example, the receiving antenna 0 has the spreading sequence "1", and the receiving antenna 1 has the spreading sequence "−1"), the weight generation unit 410 can generate weights with desired waves in a relationship in which they do not weaken each other.

In a case where the weight generation unit 410 uses a PN sequence, amplitude variation occurs between chips in addition to the phase relationship, unlike the case of using a ZC sequence that is a chirp signal. Since the spreading sequence is known also in this case, the weight generation unit 410 corrects the amplitude difference between chips together with the phase relationship and then regenerates a weight, so that the same effect as the effect described with reference to FIGS. 7 to 10 can be obtained.

For weight correction when different chips are used between the receiving antennas in the interference suppression processing, the present embodiment has described the configuration in which the weight generation unit 410 applies the weight $w_1$ to the receiving antenna 1 side and regenerates the weight $w'_1$, but the present embodiment is not limited thereto. When regenerating a weight, the weight generation unit 410 may regenerate the weight by any method as long as the phase relationship and the amplitude variation between different chips are corrected. For example, the weight generation unit 410 may regenerate a weight by correcting the weight $w_0$, or may regenerate weights by correcting both of the weights $w_0$ and $w_1$.

The present embodiment has described the case where, for a chip combination between the receiving antennas at the time of interference suppression, the combination selection unit 411 selects a combination by which the phase relationship and the amplitude relationship between the desired wave terms strengthen most, based on the channel response estimate values and the weights, but the present embodiment is not limited thereto. For example, the combination selection unit 411 may perform the interference suppression processing on all combinations of chip combinations on which to perform interference suppression, and finally combine all the combinations.

The combination selection unit 411 may select two or more combinations from all combinations and combine the selected combinations after interference suppression. The receiver 102 may calculate phase differences between the desired wave terms between the receiving antennas after the interference suppression processing, based on the weight $w'_1$ regenerated by the weight generation unit 410 and the channels estimated by the channel estimator 404, and subject a combination whose phase difference is within a preset phase difference as a threshold to combining. In this case, the receiver 102 may include a determination circuit that determines a combination whose phase difference is within a preset phase difference as a threshold.

Figure 11:
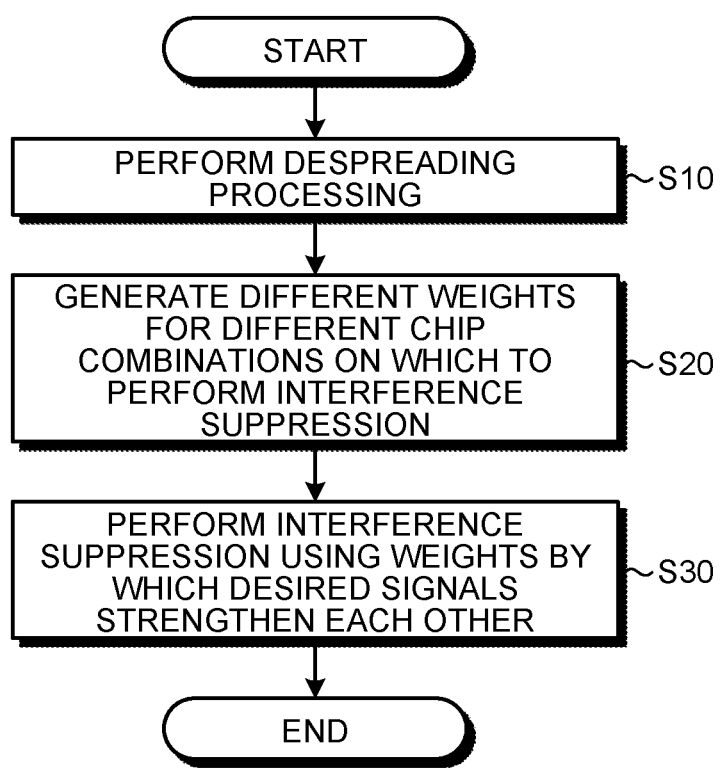
FIG. 11 is a flowchart illustrating a processing procedure of interference suppression processing by the receiver according to the embodiment.

Here, a processing procedure of the interference suppression processing by the receiver 102 will be described. FIG. 11 is a flowchart illustrating a processing procedure of the interference suppression processing by the receiver according to the embodiment. In the receiver 102, the despreading unit 403 performs the despreading processing on digital signals received from the high frequency reception processing unit 402 (step S10).

The interference suppressor 405 suppresses only interference signals of reception signals and extracts only desired signals, based on signals received from the high frequency reception processing unit 402, the despreading unit 403, and the channel estimator 404. Specifically, the interference suppressor 405 generates different weights for different chip combinations on which to perform interference suppression (step S20). The interference suppressor 405 performs interference suppression using, of the generated weights, weights by which the desired signals strengthen each other (step S30).

Next, hardware configurations of the transmitter 101 and the receiver 102 will be described. The transmitter 101 and the receiver 102 have the same hardware configuration. Thus, the hardware configuration of the receiver 102 will be described here.

The receiver 102 is implemented by processing circuitry. The processing circuitry may be a processor that executes a program stored in memory and the memory, or may be dedicated hardware such as a dedicated circuit. The processing circuitry is also referred to as a control circuit.

Figure 12:
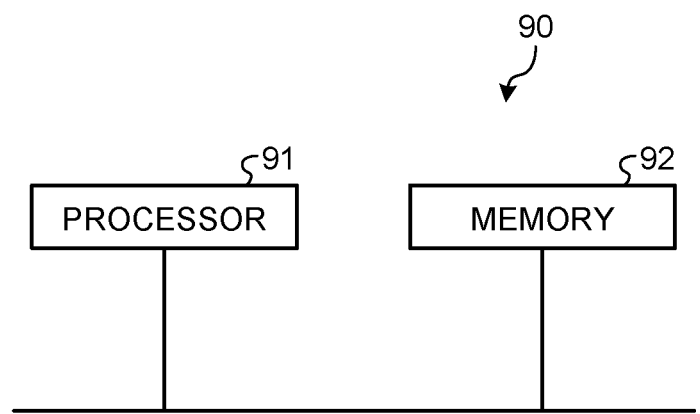
FIG. 12 is a diagram illustrating a configuration example of processing circuitry when a processor and memory implement processing circuitry included in the receiver according to the embodiment.

FIG. 12 is a diagram illustrating a configuration example of processing circuitry when a processor and memory implement processing circuitry included in the receiver according to the embodiment. Processing circuitry 90 illustrated in FIG. 12 is a control circuit and includes a processor 91 and memory 92. When the processor 91 and the memory 92 constitute the processing circuitry 90, functions of the processing circuitry 90 are implemented by software, firmware, or a combination of software and firmware. The software or firmware is described as a program and stored in the memory 92. In the processing circuitry 90, the processor 91 reads and executes the program stored in the memory 92, thereby implementing the functions. That is, the processing circuitry 90 includes the memory 92 for storing the program that results in the execution of the processing in the receiver 102. This program can be said to be a program for causing the receiver 102 to perform each function implemented by the processing circuitry 90. This program may be provided via a storage medium on which the program is stored, or may be provided via another means such as a communication medium. The program can be said to be a program to cause the receiver 102 to perform the reception processing.

Here, the processor 91 is, for example, a central processing unit (CPU), a processing unit, an arithmetic device, a microprocessor, a microcomputer, a digital signal processor (DSP), or the like. The memory 92 corresponds, for example, to nonvolatile or volatile semiconductor memory such as random-access memory (RAM), read-only memory (ROM), flash memory, an erasable programmable ROM (EPROM), or an electrically EPROM (EEPROM) (registered trademark), or a magnetic disk, a flexible disk, an optical disk, a compact disk, a mini disk, a digital versatile disc (DVD), or the like.

Figure 13:
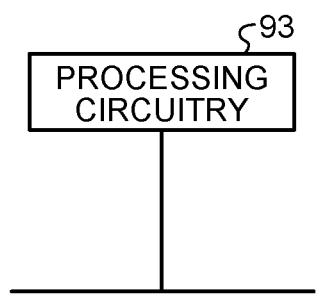
FIG. 13 is a diagram illustrating an example of processing circuitry when dedicated hardware constitutes the processing circuitry included in the receiver according to the embodiment.

FIG. 13 is a diagram illustrating an example of processing circuitry when dedicated hardware constitutes the processing circuitry included in the receiver according to the embodiment. Processing circuitry 93 illustrated in FIG. 13 corresponds, for example, to a single circuit, a combined circuit, a programmed processor, a parallel-programmed processor, an application-specific integrated circuit (ASIC), a field-programmable gate array (FPGA), or a combination of them. The processing circuitry 93 may be implemented partly by dedicated hardware and partly by software or firmware. Thus, the processing circuitry 93 can implement the above-described functions by dedicated hardware, software, firmware, or a combination of them.

As described above, in the embodiment, the interference suppressor 405 varies interference forms in reception signals by performing the reverse sequence multiplication processing on the reception signals, generates different weights for different combinations of the reception signals on which to perform interference suppression, and performs interference suppression using the generated weights. Thus, the interference suppressor 405 can prevent desired signals from being canceled out when canceling interference signals out. Consequently, the receiver 102 can improve interference resistance performance while preventing demodulation performance degradation.

The communication apparatus according to the present disclosure has the effect of being able to improve interference resistance performance while preventing demodulation performance degradation.

The configuration described in the above embodiment illustrates an example, and can be combined with another known art, and can be partly omitted or changed without departing from the gist.

What is claimed is:

1. A communication apparatus, comprising:
a plurality of receiving antennas to receive, as reception signals, interference signals and desired signals transmitted by a transmitting apparatus to perform sequence multiplication processing at a time of transmission; and
an interference suppressor to generate, for each of the receiving antennas, a weight used when combining the reception signals received by the respective receiving antennas, and perform inter-antenna combining that is combining of the reception signals, using the weights, to perform interference suppression on the reception signals, wherein
the interference suppressor performs reverse sequence multiplication processing on the reception signals to vary interference forms in the reception signals, generates the weights differently for different combinations of the reception signals on which to perform the interference suppression, and performs the interference suppression using, from among the generated weights, the weights by which the desired signals strengthen each other, wherein
the interference suppressor determines a sequence and a sequence length corresponding to the weights, based on channel estimate values estimated based on the reception signals and the interference forms estimated based on the weights.

2. The communication apparatus according to claim 1, wherein
the plurality of receiving antennas receives one identical symbol, and
the interference suppressor generates the weights differently for different combinations of chips to be subject to the interference suppression, and selects, from among the combinations of the chips, a combination by which a phase relationship and an amplitude relationship between the desired signals strengthen most when the reception signals are multiplied by the weights, to perform the interference suppression.

3. The communication apparatus according to claim 2, wherein
the interference suppressor uses a Zadoff-Chu sequence as a sequence when performing the reverse sequence multiplication processing.

4. The communication apparatus according to claim 1, wherein
the interference suppressor uses a Zadoff-Chu sequence as a sequence when performing the reverse sequence multiplication processing.

* * * * *